March 2, 1965   J. F. BAIER   3,171,597
COMBINED CIRCULATING HEATING WATER AND DOMESTIC
HOT WATER HEATING SYSTEM
Filed April 9, 1962   2 Sheets-Sheet 1

INVENTOR.
JOHN F. BAIER
BY
ATTORNEY

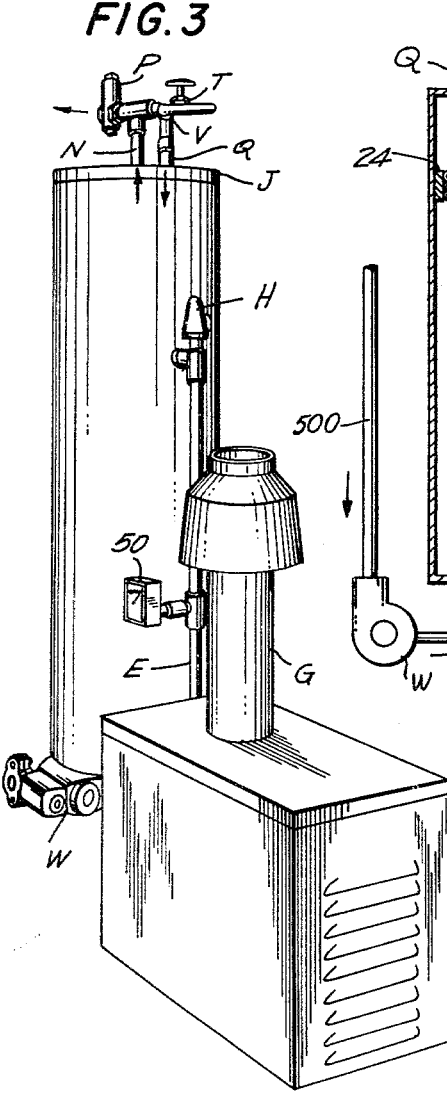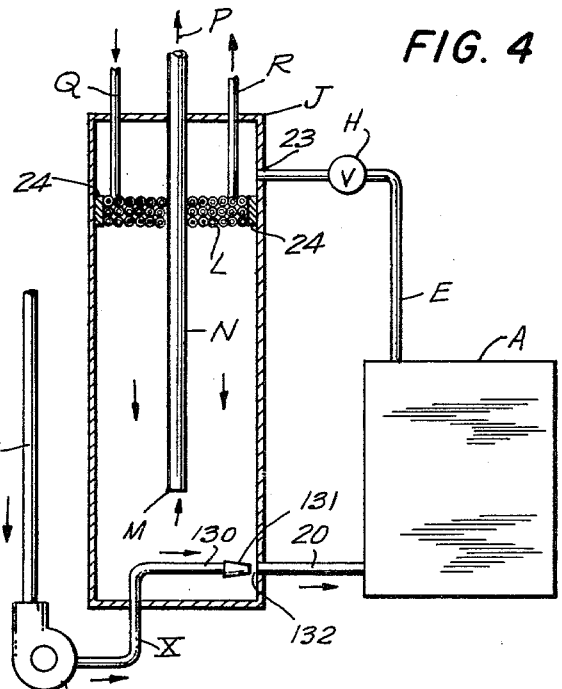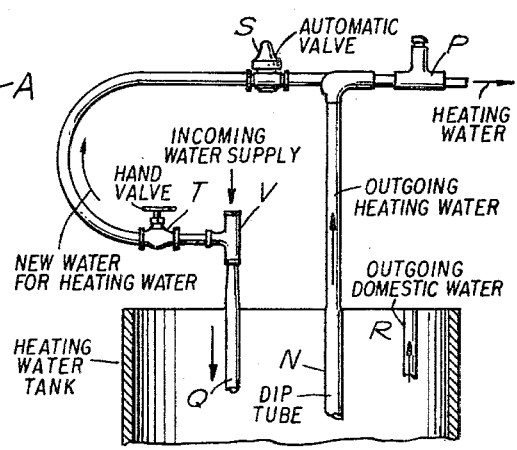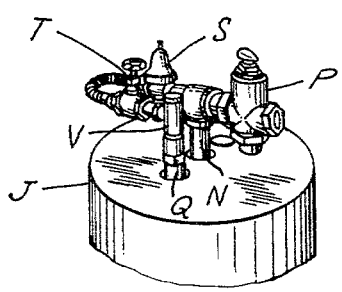

United States Patent Office 3,171,597
Patented Mar. 2, 1965

3,171,597
COMBINED CIRCULATING HEATING WATER AND DOMESTIC HOT WATER HEATING SYSTEM
John F. Baier, 44 Gramercy Park, New York, N.Y.
Filed Apr. 9, 1962, Ser. No. 186,174
14 Claims. (Cl. 237—19)

The present invention relates to a hot water system, and it particularly relates to a domestic hot water system for supplying hot water for cooking, washing and bathing facilities.

Although not limited thereto, the present invention will be particularly described in its application to a hot water system in which a hot water boiler used for supplying heating water to a radiator system may also be conveniently utilized for supplying domestic hot water for cooking, washing, bathing and other household uses.

It is, of course, understood that the present invention has a broad application to commercial and industrial applications and to its application in large or multiple sizes, but the present invention will be particularly described in its application to a small compact midget heating system useful for supplying hot water both to a hot water radiator system and hot water to faucets in the laundry, wash basin, kitchen sinks, washing machines and the like in a home or small apartment house.

It is among the objects of the present invention to provide a novel hot water heating system in which domestic hot water for cooking, bathing and washing purposes is supplied indirectly from a hot water boiler with assurance of economical use of heat available without too great bulk being employed and without loss in economy in size or convenience of installation.

Another object is to provide a convenient compact hot water system to supply heat and domestic hot water with very small boiler size, with high heat storage capacity and with greatly improved heat transfer.

Another object is to provide a most satisfactory domestic hot water supply in which a sufficient supply will be assured with boiler input ratings as low as 50,000 B.t.u. per hour without the necessity of oversizing the boiler and with most effective heating performance and with reduced fuel costs.

A further object is to provide a novel dual system gas fired hot water boiler particularly suitable for the home which will be applicable for baseboard convector and radiant systems in apartments and small homes which may be used for a single zone system or two or three zone systems.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a separate gas fired hot water cast iron boiler with a closely associated vertical cylinder tank for a built in copper coil, an expansion chamber, an insulated jacket and a flow limiting valve.

In addition, there may be provided a flow control valve, a circulator, a thermostat, a relay, a pressure reducing valve, a manual air vent, an adjustable pipe stand, adjustable pipes and the usual pipe and fittings.

Although the tank may be of varying constructions, it is desirably of an all-steel welded construction with a capacity of twenty-four gallons, and it contains adja- copper coil heat exchanger with a capacity of about three to four gallons per minute at about 200° F. average boiler water temperature.

The coil should have a temperature rise of 40° F. to 140° F. giving a full 100° F. available.

The domestic water is heated as it passes through the copper coil, and its flow is controlled by a flow limiting valve within the three to four gallon per minute capacity.

If desired, the mixing valve may be provided to supply closer control of the domestic hot water supply.

The circulating loop arrangement between the boiler and tank directs all water through the tank which also serves as an air eliminator while providing the necessary air cushion.

This arrangement also eliminates the need for electrical tank controls to interrupt the heating during the domestic hot water demand.

Although this system is particularly applicable for small homes and apartments requiring 200 to 500 square feet installed radiation and for average domestic hot water supply, it can also be supplied with zone valves or two or three zone installations.

Generally, the system may be applied to inputs of 50,000 to 125,000 B.t.u. corresponding to equivalent installed radiation ranging from 200 to 500 square feet for a number of baths and bedrooms varying from 1½ baths and 3 bedrooms up to 2½ baths and 6 bedrooms.

The installation space requirements may vary from 13" in width by 40" in length by 60" in height up to 16" in width, 45" in length and 60" in height, based upon a gas heated cast iron hot water boiler construction.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 3 is a front perspective view showing size and arrangement of the installed system.

FIG. 4 is a diagrammatic side sectional view similar to FIG. 1 but showing the internal construction.

FIG. 5 is a top perspective view upon an enlarged scale of the connections at the top of the heat exchange domestic hot water supply tank.

FIG. 7 is a diagrammatic sketch showing the flow connections at the top of the tank AA as shown in small scale in FIGS. 1, 3 and 5.

Figure 1:
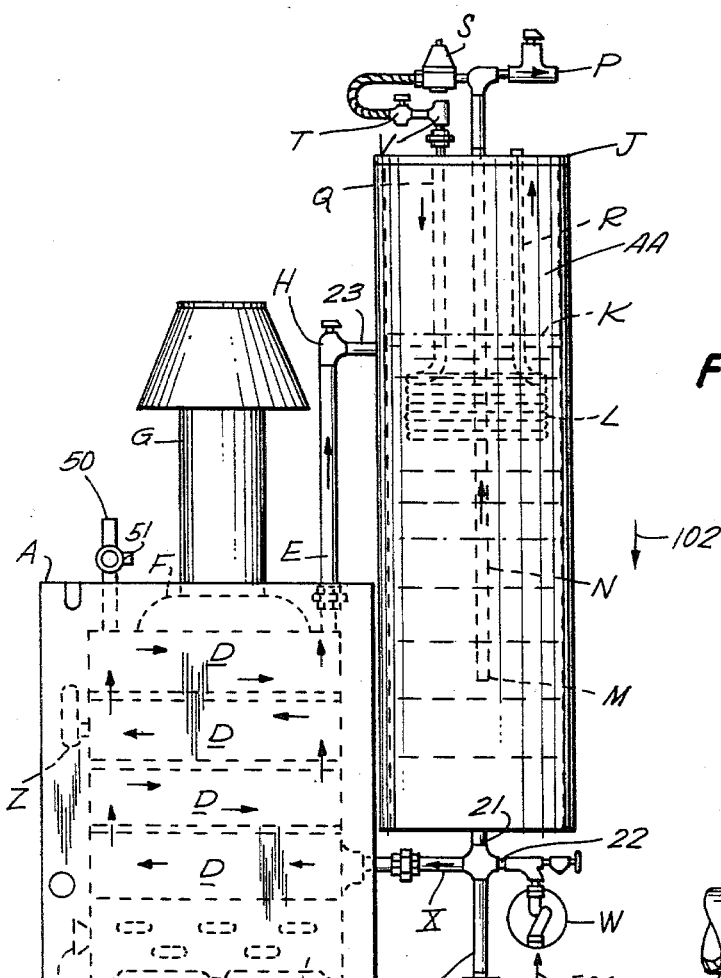
FIG. 1 is a side diagrammatic layout view showing the boiler with associated domestic hot water heating tank.

Referring to FIG. 1, there is shown a boiler housing A with a fire box B having a burner C.

The horizontal superimposed interconnection hot water construction may be of the same design with the water passing forwardly and rearwardly, and it ascends up to the interconnected sections until it reaches the hot water outlet pipe E.

The hot waste gases from which the heat has been absorbed ascend into the dome F and then through the stack G.

The hot water will flow past the automatic air vent H into the tank J below the water level K.

It will then descend through the heat exchange coil L for the domestic hot water to the lower end M of the dip tube N.

The hot water will then flow out through the dip tube N and the connection P to the heating or radiator system.

The domestic hot water will flow into the vertical conduit connection Q and out through the vertical conduit connection R, passing through the heat exchange coil L.

The pressure reducing fill valve and stop cock S is used to fill the heating system and maintain the required pressure therein. The flow limiting valve T and the flow control valve P are shown in FIG. 1 above the top of the vertical tank J. The valve S may be turned so as to permit water to flow directly into the external system through the outlet control valve P to fill the external system and drive the air therefrom. The valve is connected to the external water supply by means of the T-connection V which supplies fresh incoming water both to the pancake coil L as well as to the external heating system.

Once the external system is filled up it is not necessary to add additional water but if there is loss of water the valve S may be manually or automatically actuated to again fill up the system with water. The T-connection V receives fresh incoming water for both circulating systems. Normally the heating system is only supplied through the outlet flow control valve P from the dip tube N.

The valve P will also control the rate of flow to the external heating system from the dip tube end as well as the rate of filling from the system from the valve S. The manually operated valve T may be used to cut off any flow from the T-connection V to the valves S and T.

The vertical tank J may be provided with a float vent.

The domestic hot water supply will always travel down through pipe Q and up through pipe R as indicated by arrows and this domestic supply is obtained from an external source of water through the junction V, the upper side of which may be connected to the external water supply. This external water supply may flow through the domestic hot water system down through pipe Q as well as to the heating system through elements T, S and P. The element V is a T connection having a top vertical inlet from the external water supply, a horizontal outlet to the valves S and T and a bottom outlet to the pipe Q. There is only flow in one direction as indicated by single direction arrows along elements Q, R and P.

Below the tank J, the hot water from the heating system returns as is indicated at 500 into the circulating pump W and back to the lowermost heater sections D through the conduit X. This is accomplished by means of the jet device 100 which directs the stream of heating water from the pipe 22 into the conduit X, creating a down-flow as indicated by the arrow 101 in the conduit 21.

This flow jet arrangement, as shown in FIG. 1, will assure that the circulation will be from the bottom of the tank J into the lowermost heater section D and also from the external heating system directly into the lowermost heating section D in the manner indicated by the large arrows 102 and 103.

This will assure two separate circulating systems, one from the tank J of FIGS. 1 and 4, back into the lowermost section D, as well as from the radiator system directly through the conduits 22 and X in FIG. 1 or X and 20 in FIG. 4, back to the lowermost boiler section.

The tank is provided with an adjustable tank stand Y (see FIG. 1).

The high limit aquastat-relay is indicated at Z while the air cushion AA above the water level K will serve to remove and accumulate any air from the system.

A thermostat (not shown) may be placed upon the outflow conduit E.

Essentially in operation, the hot water will be heated up for the house or apartment heating system by passing upwardly and across each unit D in succession as indicated by the arrows inside of the boiler housing A.

When passing in zigzag fashion, the hot gases created by the gas burners in the fire box B will pass over the water tubes giving up their heat and creating a supply of hot water.

The hot water will then flow out through the pipe E into the body of water in the tank J at a point just below the water level.

The water will then flow down through the water filled portion of the tank J in the interstices between the coil L which may substantially restrict the passageway by having closely pancaked coils as indicated at L in FIG. 4 giving up substantial heating to the domestic hot water circulating from pipe Q to pipe R.

At the same time the returning water may flow from the conduit V through the pump W, through the conduit X, through the conduit 130 and the nozzle 131 into the inlet 132 in the bottom of the tank J and then into the return pipe 20 into the boiler A.

Figure 6:
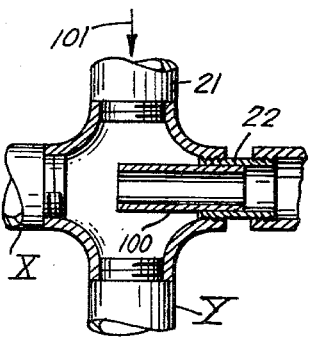
FIG. 6 is a diagrammatic fragmentary side sectional view upon an enlarged scale as compared to FIG. 1, showing the manner of feeding the return heating water into the boiler, while causing circulation through the domestic hot water heating tank.

In FIG. 1 although the returning hot water has a connection 21 to the tank J, it will flow directly from the pump W through the pipe 22 and the conduit X to the lowest section D, due to the jet action of the nozzle shown in FIG. 6.

In summertime when the radiator system is not in use, the water may circulate from the level 23 down to the return pipe 20 in FIG. 4 or 21 in FIG. 1 back to the boiler without passing up through the dip tube N.

Any by-pass flow down through the outer interior periphery of the tank J of the heated water may be obstructed by the ring 24 as shown in FIG. 4.

The embodiment of FIG. 4 differs from the embodiment of FIG. 1 in that the element 131 is inside the tank and serves the same function as the element 100 in FIGS. 1 and 6 which is outside the tank. The elements 100 of FIGS. 1 and 6 and 131 of FIG. 4 cause flow from the bottom of tank AA of FIG. 1 and J of FIG. 4 into the boiler A without any of the returning heating water flowing into the tank J. In both FIGS. 1 and 4, the boiler A, the pancake coil L, the flow pipes N, Q and R and the pump W are identical except they are shown diagrammatical in FIG. 4 and in detail in FIGS. 1 and 6.

Figure 2:
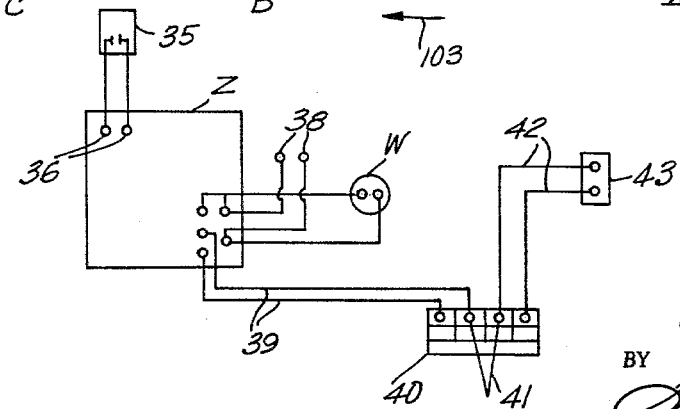
FIG. 2 is a diagrammatic layout of the electrical circuit system.

In the electrical system as shown in FIG. 2, the thermostat 35 may be positioned in a room and have connections at 36 to the Aquastat-relay Z.

This Aquastat-relay Z will have connections at 38 to external voltage supply, and it will also have connections to the circulating motor W.

The connections 39 lead to the gas valve control system 40 having a jumper 41 with connections at 42 to the power section 43.

The present invention eliminates the placing of any heat exchange coils in the boiler sections themselves and it also eliminates the disadvantage of being compelled to maintain the boiler at a high temperature throughout the year with corresponding flue losses.

Furthermore, according to the applicant's invention, it is not necessary that the boiler have sufficient water capacity or sufficient input instantaneously to heat domestic hot water, which is required to flow at a rate for example of 3 to 4 gallons per minute, with a rise of 100° above the incoming temperature.

Since this excess capacity is not required in the boiler ratings, it is possible to achieve a very small boiler construction most economically in respect to space consumption with maximum fuel efficiency.

The present system as set forth above separates the storage of water required for heating the domestic hot water coil from the boiler by placing it into an altogether separate vessel, namely the tank J.

By using a horizontal top boiler with the superimposed sections D, through which the water is caused to pass upwardly with a zigzag arrangement, there will be no by-passing of the boiler water within the boiler itself, and instead there will be set up a strong gravity circulation between the boiler and the tank, which enables elevation of the water temperature in the tank quickly and without an additional mechanical circulating means, such as a pump.

As a result, it is possible to supply domestic hot water with very small boilers simply by changing the size of the tank and increasing the water capacity of the tank, as well as the length of the pancake coil positioned therein.

The tank J may be insulated to reduce the standby loss, which will be extremely low.

The tank J will not be subject to any flue loss, as is true in cases where boilers have built in domestic hot water heating coils or where there are already separately heated domestic hot water storage tanks.

The tank J is also quite novel, in that the upper air space serves to eliminate any air in the system. Reabsorption of the air into the water is avoided by maintaining a constant tank temperature.

The dip tube M will prevent air from reaching the heating system and the tempered water will be supplied to the heating system without requiring any mechanical parts or pumps.

Furthermore, by means of the system as shown in FIG. 6, the returning water from the heating system will be directed into the lowermost boiler section and the aspirating action of the jet will assure gravity circulation between the tank and the boiler.

The unique water circulation of the present system with its dip tube arrangement indicated at N allows the cooler water in the tank to be sent to the heating arrangements thereby modulating the water temperature to the heating system and avoiding sudden hot shocks which so often cause expansion noise problems.

The dip tube arrangements also make it impossible for air bubble liberating in the boiler or in the tank J to reach the heating system.

All air of this sort will be trapped in the air cushion AA above the water level K.

The flow control valve P will prevent gravity circulation through the heating system.

The pancake L is formed of closely packed coils of copper tubing with the fins closely meshed between the various turns.

There need be only one cold water connection at S which would supply cold water to the coil L through the valve U and also to the heating system through the pressure reducing valve S.

For radiant panel systems, a manual or automatic controlled bypass is provided between the supply and the return to the heating system to reduce the water temperature in the radiant panels S.

It is thus apparent that the applicant has provided a novel combination heating water and domestic hot water heating system.

By placing the heat exchanger coil L in the tank J substantial heat storage and greatly effective heat transfer may be achieved.

In this manner, it is possible to size the boiler on the basis of heating load only and a satisfactory domestic hot water supply is achieved with input rating of 50,000 B.t.u. per minute.

The present system will supply hot domestic water both summer and winter and the energizing boiler controls as indicated at FIG. 2 will assure full domestic water service and partial heating in event of power failure.

The unit as shown in FIGS. 1 to 5 is useful for single zone or a two or three zone system.

The tank J is kept at a uniform temperature of 200° F. by gravity connections between the boiler A and the tank J.

Normally when the tank temperature drops approximately 5 degrees, the boiler A will fire and bring water temperature in the tank J back up to its previous predetermined setting.

This will occur when a domestic water demand is made upon the storage tank or by operation of the heating system.

In the boiler, there is indicated at 50 a pressure and temperature indicator and also a pressure relief valve 51 which is shown in different positions in FIG. 3.

The important features of the present invention reside in the return of water through the system indicated at FIG. 6, which acts as a venturi which directs water into the boiler.

This will eliminate gravity circulation between the tank J and the boiler A.

The expansion chamber above the water level at K will also permit the elimination of a separate expansion tank.

The dip tube N is arranged so that its end M is substantially below the water level and no air can be pumped into the system, since all air will be liberated into the expansion chamber above the water level K.

The present invention is particularly designed to be utilized in connection with horizontal type boilers connected at alternate ends as shown at the left of FIG. 1, since this type of boiler provides sufficient gravity circulation for proper operation of the system.

The hot water is stored in the present system in a completely insulated tank J without flue connections, and this greatly reduces the stand-by losses.

In the present invention, the horizontal type boiler, as indicated at the left of FIG. 1, reduces the control response, since the boiler water cannot by-pass the control point, which would result in fickle and sluggish performance.

In the arrangement shown in FIGS. 1 and 4, the hot water cannot circulate from the tank to the boiler, since the coolest water will be trapped in the boiler and can only rise into the tank as it is heated when the boiler is in operation.

As many changes could be made in the above domestic hot water system, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A hot water circulating heating water and domestic hot water kitchen and bath supply installation of the type having a hot water heating boiler with a bottom heating water return and a top outgoing heating water supply, the combination therewith of a vertical elongated hot water tank having a closely packed flat cylindrical closely spiralled pancake heat exchange coil for the domestic hot water extending slightly below the water level transversely across and restricting vertical flow through the upper median cross section of the hot water tank so that all heating water flowing down through the tank must flow in intimate heat exchange contact with the domestic hot water in the coil, returning heating water connections to the return and the bottom of the tank and outgoing heating water connection from the top supply to the tank below the water level and above the heat exchange coil, a dip tube extending vertically centrally through said tank through said coil to adjacent the bottom of the tank and having a connection at the top of the tank to the hot water heating system, and outgoing and incoming domestic hot water connections to said pancake coil at the top of the tank, said tank having three compartments thereto, an uppermost compartment consisting of an air expansion chamber above the boiler, a heating hot water inlet chamber below and in direct contact with the air expansion chamber above said flat coil and a hot water outlet chamber below the flat coil, said flat coil being restricted centrally in respect to the dip tube and exteriorly to the interior wall of the vertical tank to prevent by-passing of heating water through said chambers except in heat exchange contact with said flat coil, the return of the boiler being below the bottom of the tank and the inlet end of the dip tube being below the flat coil and there being provided two separate circulating systems, one through the boiler and one through the tank respectively for heating water and the domestic water with both passing in a horizontal direction respectively through the boiler and through the flat coil, said tank being provided with connections to return the heating water directly to the boiler in summertime and to the external heating system in wintertime.

2. A hot water circulating heating water and domestic hot water kitchen and bath supply installation of the type having a hot water heating boiler with a bottom heating water return and a top outgoing heating water supply, the combination therewith of a vertical elongated hot water tank having a closely packed flat cylindrical closely spiralled pancake heat exchange coil for the domestic hot water extending slightly below the water level transversely across and restricting vertical flow through the upper median cross section of the hot water tank so that all heating water flowing down through the tank must flow in intimate heat exchange contact with the domestic hot water in the coil, returning heating water connections to the return and the bottom of the tank and outgoing heating water connection from the top supply to the tank below the water level and above the heat exchange coil, a dip tube extending vertically centrally through said tank through said coil to adjacent the bottom of the tank and having a connection at the top of the tank to the hot water heating system, and outgoing and incoming domestic hot water connections to said pancake coil at the top of the tank, said tank being positioned at a higher level than the boiler, said tank having three compartments thereto, an uppermost compartment consisting of an air expansion chamber above the boiler, a heating hot water inlet chamber below and in direct contact with the air expansion chamber above said flat coil and a hot water outlet chamber below the flat coil, said flat coil being restricted centrally in respect to the dip tube and exteriorly to the interior wall of the vertical tank to prevent by-passing of heating water through said chambers except in heat exchange contact with said flat coil, the return of the boiler being below the bottom of the tank and the inlet end of the dip tube being below the flat coil and there being provided two separate circulating systems, one through the boiler and one through the tank respectively for heating water and the domestic water with both passing in a horizontal direction respectively through the boiler and through the flat coil, said tank being provided with connections to return the heating water directly to the boiler in summertime and to the external heating system in wintertime.

3. A hot water circulating heating water and domestic hot water kitchen and bath supply installation of the type having a hot water heating boiler with a bottom heating water return and a top outgoing heating water supply, the combination therewith of a vertical elongated hot water tank having a closely packed flat cylindrical closely spiralled pancake heat exchange coil for the domestic hot water extending slightly below the water level transversely across and restricting vertical flow through the upper median cross section of the hot water tank so that all heating water flowing down through the tank must flow in intimate heat exchange contact with the domestic hot water in the coil, returning heating water connections to the return and the bottom of the tank and outgoing heating water connection from the top supply to the tank below the water level and above the heat exchange coil, a dip tube extending vertically centrally through said tank through said coil to adjacent the bottom of the tank and having a connection at the top of the tank to the hot water heating system, and outgoing and incoming domestic hot water connections to said pancake coil at the top of the tank, said tank also being provided with a cold water inlet at the top thereof for supplying both the heating water system and the domestic hot water system, said tank having three compartments thereto, an uppermost compartment consisting of an air expansion chamber above the boiler, a heating hot water inlet chamber below and in direct contact with the air expansion chamber above said flat coil and a hot water outlet chamber below the flat coil, said flat coil being restricted centrally in respect to the dip tube and exteriorly to the interior wall of the vertical tank to prevent by-passing of heating water through said chambers except in heat exchange contact with said flat coil, the return of the boiler being below the bottom of the tank and the inlet end of the dip tube being below the flat coil and there being provided two separate circulating systems, one through the boiler and one through the tank respectively for heating water and the domestic water with both passing in a horizontal direction respectively through the boiler and through the flat coil, said tank being provided with connections to return the heating water directly to the boiler in summertime and to the external heating system in wintertime.

4. A hot water circulating heating water and domestic hot water kitchen and bath supply installation of the type having a hot water heating boiler with a bottom heating water return and a top outgoing heating water supply, the combination therewith of a vertical elongated hot water tank having a closely packed flat cylindrical closely spiralled pancake heat exchange coil for the domestic hot water extending slightly below the water level transversely across and restricting vertical flow through the upper median cross section of the hot water tank so that all heating water flowing down through the tank must flow in intimate heat exchange contact with the domestic hot water in the coil, returning heating water connections to the return and the bottom of the tank and outgoing heating water connection from the top supply to the tank below the water level and above the heat exchange coil, a dip tube extending vertically centrally through said tank through said coil to adjacent the bottom of the tank and having a connection at the top of the tank to the hot water heating sysem, and outgoing and incoming domestic hot water connections to said pancake coil at the top of the tank, said tank being provided with controls at the upper portion thereof to prevent gravity circulation of heating water and also having connections at the bottom thereof to the return heating water and also to the inlet connection for the return heating water to the boiler, said tank having three compartments thereto, an uppermost compartment consisting of an air expansion chamber above the boiler, a heating hot water inlet chamber below and in direct contact with the air expansion chamber above said flat coil and a hot water outlet chamber below the flat coil, said flat coil being restricted centrally in respect to the dip tube and exteriorly to the interior wall of the vertical tank to prevent by-passing of heating water through said chambers except in heat exchange contact with said flat coil, the return of the boiler being below the bottom of the tank and the inlet end of the dip tube being below the flat coil and there being provided two separate circulating systems, one through the boiler and one through the tank respectively for heating water and the domestic water with both passing in a horizontal direction respectively through the boiler and through the flat coil, said tank being provided with connections to return the heating water directly to the boiler in summertime and to the external heating system in wintertime.

5. A hot water circulating heating water and domestic hot water kitchen and bath supply installation of the type having a hot water heating boiler with a bottom heating water return and a top outgoing heating water supply, the combination therewith of a vertical elongated hot water tank having a closely packed flat cylindrical closely spiralled pancake heat exchange coil for the domestic hot water extending slightly below the water level transversely across and restricting vertical flow through the upper median cross section of the hot water tank so that all heating water flowing down through the tank must flow in intimate heat exchange contact with the domestic hot water in the coil, returning heating water connections to the return and the bottom of the tank and outgoing heating water connection from the top supply to the tank below the water level and above the heat exchange coil, a dip tube extending vertically centrally through said tank through said coil to adjacent the bottom of the tank and having a connection at the top of the tank to the hot water heating system, and outgoing and incoming domestic hot water connections to said pancake coil at the top of the tank, said tank being provided with controls at the upper portion thereof to prevent gravity circulation of heating water and also having connections at the bottom thereof to the return heating water and also to the inlet connection for the return heating water to the boiler, said last mentioned connections including a venturi arrangement to insure that the return heating water will flow into the boiler, said tank having three compartments thereto, an uppermost compartment consisting of an air expansion chamber above the boiler, a heating hot water inlet chamber below and in direct contact with the air expansion chamber above said flat coil and a hot water outlet chmaber below the flat coil, said flat coil being restricted centrally in respect to the dip tube and exteriorly to the interior wall of the vertical tank to prevent by-passing of heating water through said chambers except in heat exchange contact with said flat coil, the return of the boiler being below the bottom of the tank and the inlet end of the dip tube being below the flat coil and there being provided two separate circulating systems, one through the boiler and one through the tank respectively, for heating water and the domestic water with both passing in a horizontal direction respectively through the boiler and through the flat coil, said tank being provided with connections to return the heating water directly to the boiler in summertime and to the external heating system in wintertime.

6. A hot water circulating heating water and domestic hot water kitchen and bath supply installation of the type having a hot water heating boiler with a bottom heating water return and a top outgoing heating water supply, the combination therewith of a vertical elongated hot water tank having a closely packed flat cylindrical closely spiralled pancake heat exchange coil for the domestic hot water extending slightly below the water level transversely across and restricting vertical flow through the upper median cross section of the hot water tank so that all heating water flowing down through the tank must flow in intimate heat exchange contact with the domestic hot water in the coil, returning heating water connections to the return and the bottom of the tank and outgoing heating water connection from the top supply to the tank below the water level and above the heat exchange coil, a dip tube extending vertically centrally through said tank through said coil to adjacent the bottom of the tank and having a connection at the top of the tank to the hot water heating system, and outgoing and incoming domestic hot water connections to said pancake coil at the top of the tank, said tank being provided with controls at the upper portion thereof to prevent gravity circulation of heating water and also having connections at the bottom thereof to the return heating water and also to the inlet connection for the return heating water to the boiler, said hot water tank having an expansion chamber above the tank water level, said tank having three compartments thereto, an uppermost compartment consisting of an air expansion chamber above the boiler, a heating hot water inlet chamber below and in direct contact with the air expansion chamber above said flat coil and a hot water outlet chamber below the flat coil, said flat coil being restricted centrally in respect to the dip tube and exteriorly to the interior wall of the vertical tank to prevent by-passing of heating water through said chambers except in heat exchange contact with said flat coil, the return of the boiler being below the bottom of the tank and the inlet end of the dip tube being below the flat coil and there being provided two separate circulating systems, one through the boiler and one through the tank respectively for heating water and the domestic water with both passing in a horizontal direction respectively through the boiler and through the flat coil, said tank being provided with connections to return the heating water directly to the boiler in summertime and to the external heating system in wintertime.

7. A hot water circulating heating water and domestic hot water kitchen and bath supply installation of the type having a hot water heating boiler with a bottom heating water return and a top outgoing heating water supply, the combination therewith of a vertical elongated hot water tank having a closely packed flat cylindrical closely spiralled pancake heat exchange coil for the domestic hot water extending slightly below the water level transversely across and restricting vertical flow through the upper median cross section of the hot water tank so that all heating water flowing down through the tank must flow in intimate heat exchange contact with the domestic hot water in the coil, returning heating water connections to the return and the bottom of the tank and outgoing heating water connection from the top supply to the tank below the water level and above the heat exchange coil, a dip tube extending vertically centrally through said tank through said coil to adjacent the bottom of the tank and having a connection at the top of the tank to the hot water heating system, and outgoing and incoming domestic hot water connections to said pancake coil at the top of the tank, said tank being provided with controls at the upper portion thereof to prevent gravity circulation of heating water and also having connections at the bottom thereof to the return heating water and also to the inlet connection for the return heating water to the boiler, said water boiler consisting of a series of horizontal sections alternately connected at opposite ends, said tank having three compartments thereto, an uppermost compartment consisting of an air expansion chamber above the boiler, a heating hot water inlet chamber below and in direct contact with the air expansion chamber above said flat coil and a hot water outlet chamber below the flat coil, said flat coil being restricted centrally in respect to the dip tube and exteriorly to the interior wall of the vertical tank to prevent by-passing of heating water through said chambers except in heat exchange contact with said flat coil, the return of the boiler being below the bottom of the tank and the inlet end of the dip tube being below the flat coil and there being provided two separate circulating systems, one through the boiler and one through the tank respectively for heating water and the domestic water with both passing in a horizontal direction respectively through the boiler and through the flat coil, said tank being provided with connections to return the heating water directly to the boiler in summertime and to the external heating system in wintertime.

8. A hot water boiler arrangement for supplying heating and domestic hot water, of the type having an external heating water radiator system, a hot water boiler at a low level with superimposed multiple horizontal sections having a gas burner below the sections and an incoming heating water first inlet to the lowermost sections and alternative end connections between the opposite ends of the sections in ascending order and an outgoing hot water second outlet at the uppermost section; the combination therewith of a domestic hot water heater including a high level vertically elongated cylindrical tank with its bottom well above the lowermost section and its top well above the uppermost section having a top third inlet for the incoming domestic water and a top fourth outlet for the outgoing domestic water, an intermediate horizontal barrier within said tank above said uppermost section composed of a closely packed flat spiral coil with the spiral pipes in close contact with each other so as to prevent ready flow therethrough and only restricted flow from above to below the coil, internal connections from said third inlet and fourth outlet respectively to a fifth inlet at the top of the coil and a sixth outlet from the top of the coil, said fifth inlet and sixth outlet being adjacent to the outside of the top side of the periphery of the coil, said tank having an upper air trap chamber at the top thereof, an intermediate heating water inlet chamber directly below the air chamber and in contact therewith and above the coil and a heating water outlet chamber below the coil, a central top seventh outlet for heating water from the top of the tank, a central bottom eighth outlet for heating water from the bottom of the tank, a dip tube connected to the seventh outlet extending axially and vertically through the air, inlet and outlet chambers and through the coil to about the level of the sections to receive heating water and conduct it to the external system, a return heating water conduit connected to said first inlet and said eighth outlet and means to cause said return heating water to pass said outlet and draw water from said eighth outlet to said first outlet.

9. The arrangement of claim 8, said last mentioned means including an elongated tube extending across said eighth outlet and projecting toward said first inlet.

10. The arrangement of claim 8, said seventh outlet and said third inlet being connected together at the top of the tank.

11. The arrangement of claim 8, said flat coil being sealed to the interior adjacent wall of the tank.

12. The arrangement of claim 8, said top of the tank having a flow connection to feed the external system including a hand operated pressure reducing valve and an automatically operated filler valve in series.

13. The arrangement of claim 8, said last mentioned means consisting of a venturi arrangement.

14. The arrangement of claim 8, said fifth inlet and said first inlet having T connections to the seventh and eighth outlets respectively and control means to cause all flow to pass from the inlets past the outlets without flowing into said outlets.

References Cited in the file of this patent

UNITED STATES PATENTS

| | | |
|---|---|---|
| 1,473,036 | Greenham | Nov. 6, 1923 |
| 1,785,098 | Seidel | Dec. 16, 1930 |
| 1,973,842 | Broderick | Sept. 18, 1934 |
| 2,020,064 | Kehm | Nov. 5, 1935 |
| 2,290,347 | Moore et al. | July 21, 1942 |
| 2,607,535 | Moore | Aug. 19, 1952 |
| 2,802,629 | Hofmeister | Aug. 13, 1957 |